March 16, 1954

R. B. HOWARD 2,672,175

PIPE EXPANDER

Filed June 3, 1952

INVENTOR
Russell B. Howard

BY Sherman Levy
ATTORNEY

March 16, 1954 R. B. HOWARD 2,672,175
PIPE EXPANDER
Filed June 3, 1952 2 Sheets-Sheet 2
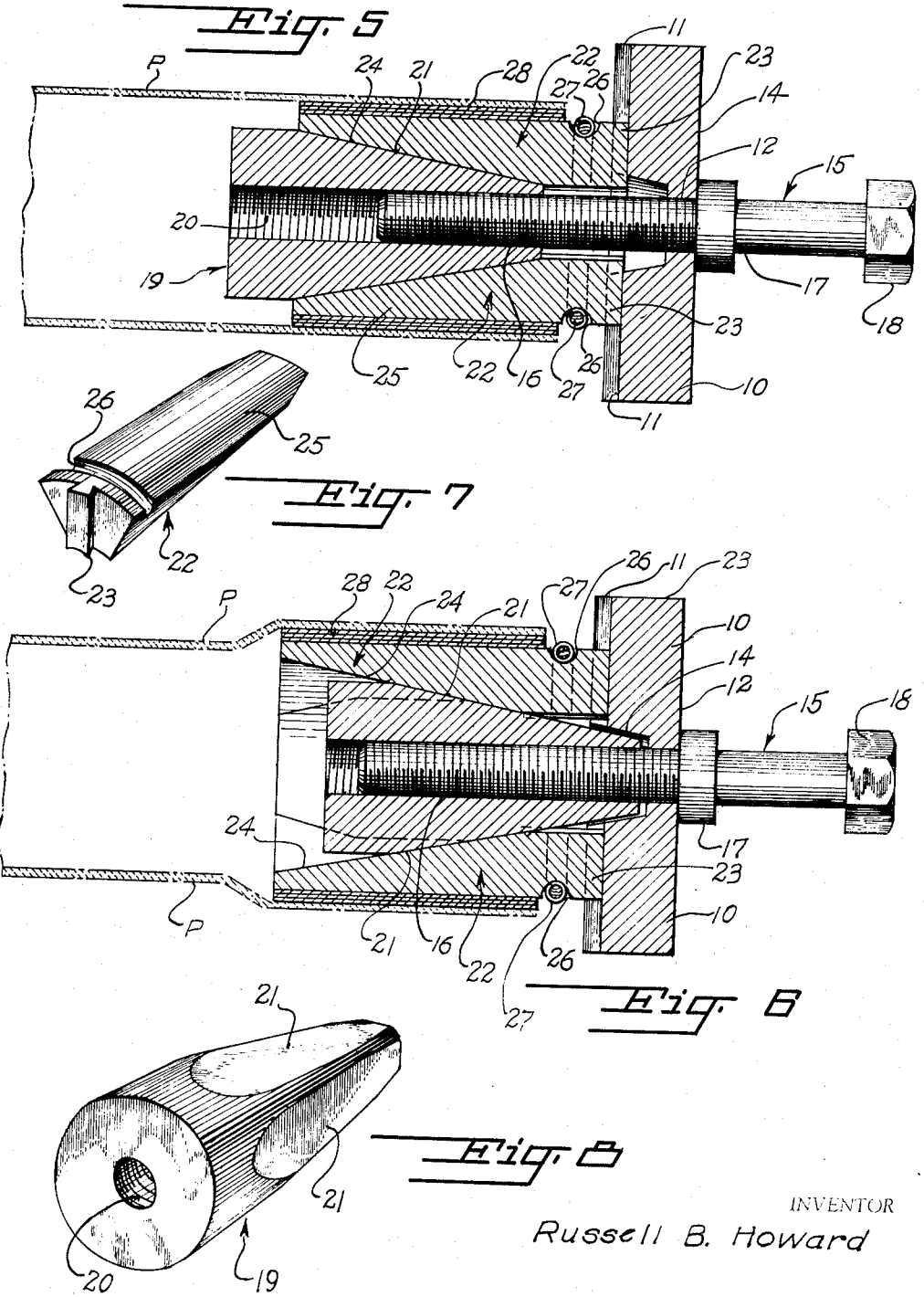
INVENTOR
Russell B. Howard
BY
ATTORNEY Patented Mar. 16, 1954

2,672,175

UNITED STATES PATENT OFFICE 2,672,175

PIPE EXPANDER

Russell B. Howard, Putney, Vt.

Application June 3, 1952, Serial No. 291,425

2 Claims. (Cl. 153—80)

This invention relates to a tool, and more particularly to a tool for use in expanding and shaping pipe.

The object of the invention is to provide a tool for use in expanding pipe, such as automotive exhaust or tail pipes, and wherein the tool of the present invention can also be used by plumbers in expanding various sizes of pipes.

Another object of the invention is to provide a pipe expander which includes a plate that has a plurality of body members slidably connected thereto, there being means provided for causing expansion and contraction of the sliding body members whereby a pipe, such as automotive exhaust or tail pipes can readily be expanded.

Still another object of the invention is to provide a pipe expander which can be used for expanding various sizes of pipes, such as automotive exhaust, mufflers and tail pipes and can also be used by plumbers in expanding and shaping pipes whereby the time required for joining together pipes can be greatly reduced.

A further object of the invention is to provide a pipe expander which is extremely simple and inexpensive to manufacture.

Other objects and advantages will be apparent during the course of the following description.

In the accompanying drawings, forming a part of this application, and in which like numerals are used to designate like parts throughout the same:

Figure 5 is a sectional view taken on the line 5—5 of Figure 2.

Figure 6 is a view taken on the line 6—6 of Figure 3.

Figure 7 is a perspective view of one of the sliding body members.

Figure 8 is a perspective view of the actuating block.

Figure 1:
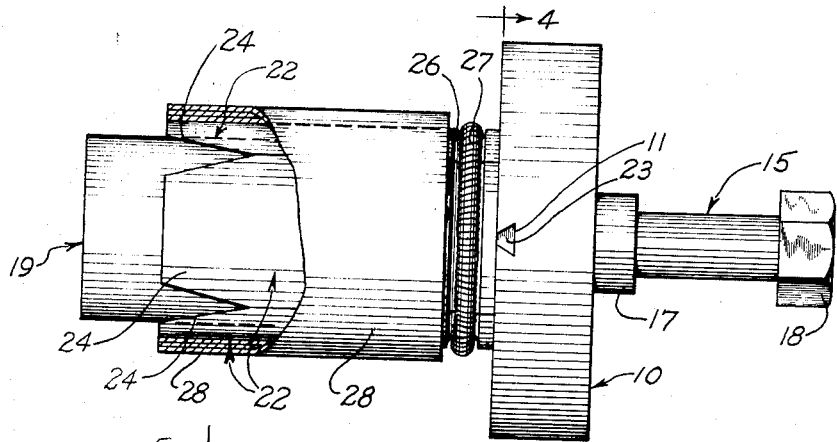
Figure 1 is a side elevational view of the pipe expander of the present invention, with parts broken away and in section.

Referring in detail to the drawings, the numeral 10 designates a cylindrical plate which may be fabricated of any suitable material such as a suitable metal, and the plate 10 is provided with a plurality of dovetailed grooves 11, for a purpose to be later described. The plate 10 is also provided with a central opening 12 and a tapered recess or socket 14, the socket 14 communicating with the opening 12.

Extending through the opening 12 and socket 14 is a bolt or stem 15 which includes a threaded portion 16. A stop collar 17 is arranged intermediate the ends of the stem 15 and secured thereto or formed integral therewith for limiting inward movement of the stem 15. Arranged on the outer end of the stem or bolt 15 is a hexagonal shaped head 18 whereby a suitable tool such as a wrench can be arranged in engagement with the head 18 in order to facilitate the rotation of the stem or bolt 15.

The pipe expander of the present invention further includes an actuating member or block which is indicated generally by the numeral 19. The block 19 includes a longitudinally extending internally threaded bore 20 which threadedly receives the threaded portion 16 of the stem 15. Thus by rotating the stem 15 the block 19 will move toward and away from the plate 10. The block 19 is provided with a plurality of flat tapered or inclined faces 21, Figure 8.

The present invention further includes a plurality of slidable body members 22 which each have formed integral therewith or secured thereto a tongue 23. The tongues 23 of the body members 22 slidably engage in the grooves 21 whereby the body members 22 will be properly guided during their expansion and contraction. The inner surface of each of the body members 22 is tapered or inclined as at 24 for coaction with the inclined flat faces 21 of the block 19 so that as the block 19 moves toward and away from the plate 10 due to the action of the rotating stem 15, then the body member 22 will be caused to expand and contract to thereby properly shape the pipe P being worked upon.

Each of the body members 22 has its outer surface shaped arcuately as at 25, Figure 7, and further each of the body members 22 is provided with an arcuate groove or cut-out 26. When the parts are assembled, the cut-out 26 in each of the body members 22 register with each other.

Figure 3:
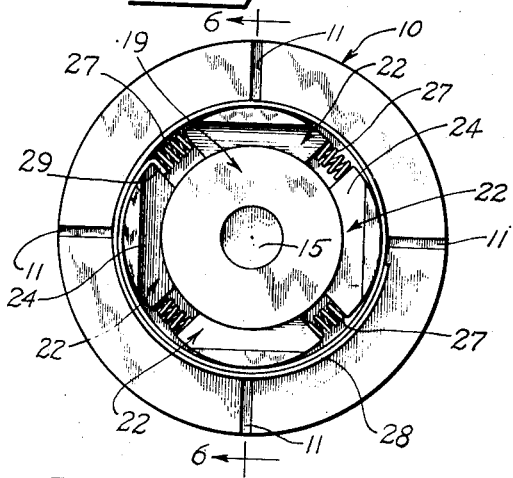
Figure 3 is a view similar to Figure 2, but with the parts in their expanded position.

A resilient means is provided for normally urging the plurality of body members 22 toward their contracted or innermost position. This resilient means comprises a coil spring 27 which surrounds the body members 22 and is seated in the cut-outs 26. A coplanar coiled spring member 28 is circumposed upon the arcuate portions 25 of the body members 22 and it also encircles or surrounds the body members 22. The spring member 28 is provided with a lip 29, Figure 3, which helps maintain the spring member 28 in its proper position on the body members 22.

Figure 2:
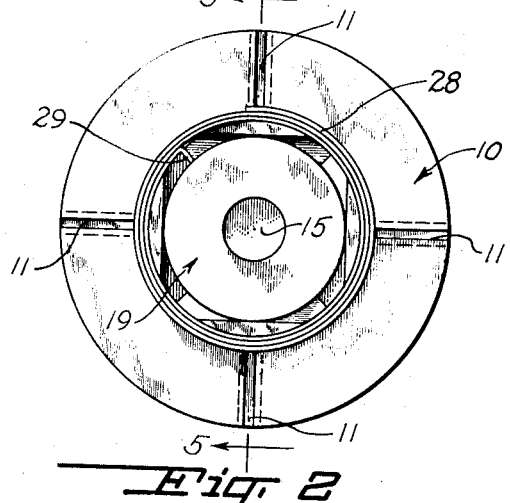
Figure 2 is an end elevational view of the pipe expander.
Figure 4:
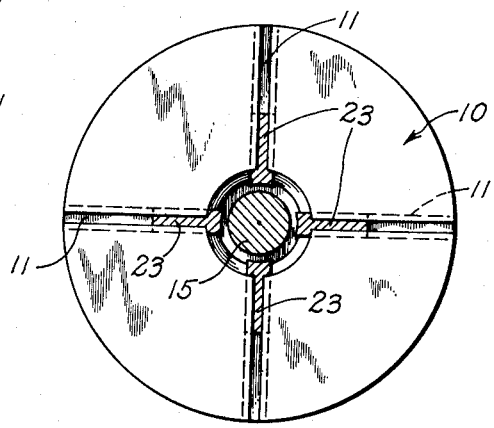
Figure 4 is a sectional view taken on the line 4—4 of Figure 1.

In use, the present invention can be used for expanding various types and sizes of pipes such as tail and exhaust pipes and mufflers of automotive vehicles. Initially, the parts are in their contracted position as shown in Figure 2 and then the device is inserted into the pipe to be expanded as for example the pipe P shown in Figure 5. Then, the stem or bolt 15 is rotated by means of a suitable wrench applied to the hexagonal shaped head 18 and this rotation of the stem 15 causes the block 19 to move toward the plate 10 from the position shown in Figure 5 to the position shown in Figure 6. As the block 19 moves toward the plate 10, the inclined faces 21 of the block 19 engage the tapered faces 24 of the body members 22 to thereby cause the body members 22 to be moved radially outwardly and expand the pipe P as shown in Figure 6. When the tool of the present invention is to be removed from the pipe P, the stem 15 is rotated in the opposite direction so that the block 19 will be moved away from the plate 10. At the same time the spring member 28 and the coil spring 27 will bias or urge the body members 22 inwardly.

It is to be understood that the tool of the present invention can be made in various sizes and for example a complete unit may include two of the actuating members 19 which can be used interchangeably for expanding pipes of smaller or larger size. By means of the present invention mechanics will be able to save time in fitting pipes together and plumbers will also find much use for the present invention. The device of the present invention will serve to align or make pipes round again in the event that they have become out of alignment. The lip 29 on the spring member 28 is interposed between a pair of the body members 22 and serves to prevent the spring member 28 from rotating when the body members are forced outwardly. The spring member 28 is wound tightly about the outer surfaces of the body members 22 and also acts as a retracting spring but serves mainly to keep the pipe P round.

I claim:

1. In a pipe expander, a cylindrical plate provided with a central opening, there being a tapered socket in said plate communicating with said opening, said plate being provided with a plurality of radially extending dovetailed grooves in one side thereof, a stem extending through the opening in said plate and provided with an exteriorly threaded portion, a stop collar arranged on said stem intermediate the ends thereof, a wrench engaging head arranged on said stem, an actuating block provided with a longitudinally extending threaded bore for receiving the threaded portion of said stem, said block being provided with a plurality of tapered outer flat faces, a plurality of sliding body members each provided with an inclined inner face for engaging the tapered face of said block, a tongue arranged on an end of each of said body members and slidably engaging said grooves, and resilient means arranged in engagement with said body members for normally urging said body members toward each other, said resilient means comprising a coplanar coiled spring member circumposed on said body member for engaging the inside portion of the pipe being expanded, there being registering arcuate cut-outs arranged in said body members, and a coil spring extending around said body members and seated in said cut-outs.

2. The apparatus as described in claim 1, wherein the outer surface of each of said body members is shaped arcuately, and a lip extending from said spring member for maintaining said spring member on said body members.

RUSSELL B. HOWARD.

References Cited in the file of this patent

UNITED STATES PATENTS

| Number | Name | Date |
|--------|------|------|
| 182,724 | Tyler | Sept. 26, 1876 |
| 428,416 | Riley | May 20, 1890 |
| 523,009 | Riddell | July 17, 1894 |
| 1,408,546 | Sweeney | Mar. 7, 1922 |
| 1,645,239 | Hume | Oct. 11, 1927 |
| 1,680,650 | Travis | Aug. 14, 1928 |
| 1,908,521 | Lindgren | May 9, 1933 |
| 2,053,815 | Panthou | Sept. 8, 1936 |
| 2,226,078 | Spahn | Dec. 24, 1940 |
| 2,321,308 | Miller | June 8, 1943 |
| 2,461,565 | Morrill | Feb. 15, 1949 |